(12) United States Patent
Fiut et al.

(10) Patent No.: US 8,014,306 B2
(45) Date of Patent: *Sep. 6, 2011

(54) INTEGRATION OF REMOTE MICROCELL WITH CDMA INFRASTRUCTURE

(75) Inventors: Brian Douglas Fiut, Lake in the Hills, IL (US); Timothy Jason Joyce, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1391 days.

This patent is subject to a terminal disclaimer.

(21) Appl. No.: 11/261,251

(22) Filed: Oct. 28, 2005

(65) Prior Publication Data

US 2006/0062194 A1 Mar. 23, 2006

Related U.S. Application Data

(63) Continuation of application No. 10/022,147, filed on Dec. 13, 2001, now Pat. No. 6,950,421, which is a continuation of application No. 09/088,506, filed on Jun. 1, 1998, now Pat. No. 6,366,571.

(51) Int. Cl.
*H04L 12/28* (2006.01)
*H04B 7/216* (2006.01)
*H04B 17/00* (2006.01)

(52) U.S. Cl. ..... 370/252; 370/335; 370/342; 455/67.11; 455/522; 455/561

(58) Field of Classification Search ............... 370/252, 370/335, 342; 455/562, 562.1, 67.11–67.16; 398/77–78, 25–33
See application file for complete search history.

(56) References Cited

U.S. PATENT DOCUMENTS

| | | | | |
|---|---|---|---|---|
| 5,062,703 | A | * | 11/1991 | Wong et al. ............ 356/73.1 |
| 5,280,472 | A | * | 1/1994 | Gilhousen et al. ........... 370/335 |
| 5,504,936 | A | * | 4/1996 | Lee ................ 455/436 |
| 5,802,173 | A | * | 9/1998 | Hamilton-Piercy et al. . 379/56.2 |
| 5,831,974 | A | * | 11/1998 | Suonvieri .............. 370/252 |
| 6,094,562 | A | * | 7/2000 | Zhong ................ 455/67.16 |
| 6,122,529 | A | | 9/2000 | Sabat, Jr. et al. |
| 6,366,571 | B1 | * | 4/2002 | Fiut et al. .............. 370/342 |
| 6,950,421 | B2 | * | 9/2005 | Fiut et al. .............. 370/342 |

* cited by examiner

Primary Examiner — Steven H Nguyen
(74) Attorney, Agent, or Firm — Toler Law Group

(57) ABSTRACT

A method of interconnecting a CDMA cellsite having signal advancing capabilities with at least one remote microcell without re-synchronization capabilities. The method of the present invention sufficiently advances the signal to compensate for the time delay induced by communication signal travel over a fiber optic connection between a base station cellsite and a remote microcell.

29 Claims, 8 Drawing Sheets

Microcell Data Sheet
Standalone and Standalone Simulcast Configuration

Call Site: _____
Face: _____
Date: _____

| | | Remote 1 | Remote 2 | Remote 3 | Remote 4 | Remote 5 |
|---|---|---|---|---|---|---|
| | Measurements Section | | | | | |
| 24 | Fiber Distance 1310 nm (kft): | | | | | |
| 28 | Fiber Distance 1550 nm (kft): | | | | | |
| | Attenuator Value Used For Pout Mess. @ Remote (dB): | | | | | |
| 32 | Pout @ Remote Antenna (dBm): | | | | | |
| | Pout @ Remote Antenna For 1 Radio Incl. Atten. (dBm): | | | | | |
| 36 | Pout @ Remote RF Monitor (dBm): | | | | | |
| 40 | Pin @ Digitizer For 1 Analog Radio (dBm): | | | | | |
| | Total # Radios On Face (Incl. CDPD & Setup): | | | | | |
| | Radios In CDMA Bandwidth | | | | | |
| 46 | LPA Attenuation: | | | | | |
| | TX RIM Setting: | | | | | |
| | RX RIM Setting: | | | | | |
| | Digitizer Rev. #: | | | | | |
| | PN Offset | | | | | |

| | | | | | | |
|---|---|---|---|---|---|---|
| | Calculations Section | | | | | |
| 82 | Transmit Propagation Delay Calculation | | | | | |
| 84 | Transmit Propagation Delay Translation Value | | | | | |
| 88 | Receive Propagation Delay Calculation | | | | | |
| 90 | Receive Propagation Delay Translation Value | | | | | |
| 94 | Maximum Differential Delay Calculation | | | | | |
| 95 | Maximum Differential Delay Value | 0.0 | | | | |
| 98 | Sector Size Calculation | | | | | |
| 102 | Cell Search Window Size Calculation | | | | | |
| 106 | Analog Composite Power To Digitizer | | | | | |
| 108 | Total Gain Check Calculation | | | | | |
| 112 | Actual Gain Check Calculation | | | | | |
| 116 | CDMA Pin @ Digitizer Pilot Only | | | | | |
| 120 | Total Power @ Digitizer (CDMA & Analog) | | | | | |

| | | |
|---|---|---|
| | Translations Section | |
| 84 | Transmit Antenna Propagation Delay (microseconds) | |
| 90 | Receive Antenna Propagation Delay (microseconds) | |
| 102 | Search Window Size: Call (microseconds) | |
| 98 | Sector Size (miles) | |
| | Maximum Differential Transmit Delay (microseconds) | 0.0 |
| | Initial Power Offset for Access | -5 |
| | Access Probe Power Incremen(dB) | 4 |
| | BCR Attanuation (dB) | 6 |
| | Access Channel Preamble Length (frames) | 2 |
| | Time Randomization for Access Channel Probes | 6 |
| | Eb/No Setpoint - Minimum (dB) Rate Set 2 | 5.0 |
| | Eb/No Setpoint - Maximum (dB) Rate Set 2 | 9.8 |
| | Max Pwr | 25.0 |

| Cell Site Tx Delay | 22.8 |
|---|---|
| Cell Site Rx Delay | 14.0 |

| | Rev 1 | Rev 2 |
|---|---|---|
| Microcell Tx Delay | 1 | 8 |
| Microcell Rx Delay | 3 | 17 |

FIG. 3

Microcell Data Sheet
Simulcast Configuration

Call Site: _____
Face: _____
Date: _____

| | | Remote 1 | Remote 2 | Remote 3 | Remote 4 | Remote 5 |
|---|---|---|---|---|---|---|
| | Measurements Section | | | | | |
| 24 | Fiber Distance 1310 nm (kft): | | | | | |
| 28 | Fiber Distance 1550 nm (kft): | | | | | |
| | Attenuator Value Used For Pout Mess. @ Remote (dB): | | | | | |
| 32 | Pout @ Remote Antenna (dBm): | | | | | |
| | Pout @ Remote Antenna For 1 Radio Incl. Atten. (dBm): | | | | | |
| 36 | Pout @ Remote RF Monitor (dBm): | | | | | |
| 40 | Pin @ Digitizer For 1 Analog Radio (dBm): | | | | | |
| 44 | Pout @ Foam Jumper For CDMA on Macroface | | | | | |
| 46 { | Total # Radios On Face (Incl. CDPD & Setup): | | | | | |
| | Radios In CDMA Bandwidth | | | | | |
| | LPA Attenuation: | | | | | |
| | TX RIM Setting: | | | | | |
| | RX RIM Setting: | | | | | |
| | Digitizer Rev. #. | | | | | |
| | BCR Setting: | | | | | |
| | PN Offset | | | | | |

| | | Remote 1 | Remote 2 | Remote 3 | Remote 4 | Remote 5 |
|---|---|---|---|---|---|---|
| | Calculations Section | | | | | |
| 82 | Transmit Propagation Delay Calculation | | | | | |
| 86 | Transmit Propagation Delay Translation Value | 22.8 | | | | |
| 88 | Receive Propagation Delay Calculation | | | | | |
| 92 | Receive Propagation Delay Translation Value | 14.0 | | | | |
| 94 | Maximum Differential Delay Calculation | | | | | |
| 95 | Maximum Differential Delay Value | 0.0 | | | | |
| 98 | Sector Size Calculation | | | | | |
| 102 | Cell Search Window Size Calculation | | | | | |
| 106 | Analog Composite Power To Digitizer | | | | | |
| 108 | Total Gain Check Calculation | | | | | |
| 112 | Actual Gain Check Calculation | | | | | |
| 116 | CDMA Ideal Power Level Calculation | | | | | |
| 120 | Total Power @ Digitizer (CDMA & Analog) | | | | | |

| | Translations Section | |
|---|---|---|
| | Transmit Antenna Propagation Delay (microseconds) | 22.8 |
| | Receive Antenna Propagation Delay (microseconds) | 14.0 |
| 102 | Search Window Size: Call (microseconds) | |
| 98 | Sector Size (miles) | |
| | Maximum Differential Transmit Delay (microseconds) | 0.0 |
| | Initial Power Offset for Access | -5 |
| | Access Probe Power Incremen(dB) | 4 |
| | Access Channel Preamble Length (frames) | 2 |
| | Time Randomization for Access Channel Probes | 6 |
| | Eb/No Setpoint - Minimum (dB) Rate Set 2 | 5.0 |
| | Eb/No Setpoint - Maximum (dB) Rate Set 2 | 9.8 |
| | Max Pwr | |

| Cell Site Tx Delay | 22.8 |
|---|---|
| Cell Site Rx Delay | 14.0 |

| | Rev 1 | Rev 2 |
|---|---|---|
| Microcell Tx Delay | 1 | 8 |
| Microcell Rx Delay | 3 | 17 |

FIG. 4

INTEGRATION OF REMOTE MICROCELL WITH CDMA INFRASTRUCTURE

CROSS-REFERENCE TO RELATED APPLICATIONS

This is a continuation of U.S. patent application Ser. No. 10/022,147 filed Dec. 13, 2001 now U.S. Pat. No. 6,950,421, which is a continuation of U.S. patent application Ser. No. 09/088,506 filed on Jun. 1, 1998, now U.S. Pat. No. 6,366,571.

TECHNICAL FIELD

This invention relates to a Code Division Multiple Access (CDMA) communication system and more particularly to a CDMA system integrated with a remote microcell communication system.

BACKGROUND ART

Microcells in a cellular communication system allow coverage and additional capacity in an area that is not reachable by a base station cellsite, such as a CDMA cellsite. The CDMA system has up to six faces. Three are physical faces, which are the three physical faces of the system's antenna. There are also three virtual faces that behave as a physical face but are not a physical part of the antenna of the CDMA system.

Each virtual face can be a remote microcell, and more than one remote microcell can be integrated with each face. A remote microcell is installed in the area of desired coverage and is then connected back to the base station cellsite through appropriate channels, such as optical fiber.

Remote microcell arrangements, however, experience time delays in the signal caused by the excessive amount of time required for the CDMA signal to travel from the base station cellsite to the remote microcell, and then to travel through the internal circuitry of the microcell itself. CDMA is a synchronized system, working in conjunction with the Global Positioning Satellite (GPS) system, and some microcell systems do not have re-synchronizing capabilities. Therefore, the time delayed signal emitted by the microcell can also be out of synch with the rest of the CDMA system causing communication problems.

The delayed signal is often compensated for by setting an extremely large search window size parameter to allow a mobile device, i.e. a handset, to access the system. The mobile device will accept a late signal and has the capability to synthesize the late signal. However, this takes up processing power. In addition, a wider search window size takes more time to scan and therefore, adds more time delay in the system making it less reliable. It is desirable to have a narrow search window for faster, reliable service.

The excessive delay caused during a round-trip of the signal can also result in call setup failures. In general, a predetermined sector size that is broadcast to the mobile device establishes the area to be served. Radio waves take a set amount of time to travel through the air and return. A limit is set for the amount of time given for a signal to travel to the mobile device and broadcast back out, which effectively circumscribes an active communication circle around the mobile device. Because of signal delay in the optic fiber, the CDMA system can perceive the signal delay as an indication that the mobile device is much farther away from the microcell than it actually is and the call will not be allowed on the system, thus resulting in call setup failures. It is desirable to have a large sector size, but the time delay associated with a large sector size is undesirable.

Prior art devices have compensated for the delay between CDMA and a remote microcell by inducing delay in order to provide the appearance of a synchronized system. In the prior art, the delay is induced to allow greater than one microsecond of difference between the two signals so that a receiver can provide multipath signals. The system appears to be synchronized by providing multiple paths for signals to travel. However, this approach does not address the problem of extremely large search window sizes and call setup failures.

It is an object of the method of the present invention to integrate a microcell system that does not have a re-synchronizing device, with a CDMA system to eliminate the above mentioned problems caused by signal delay associated with remote microcells and CDMA base stations.

It is another object of the present invention to provide a method for integrating the microcell system with the CDMA system by advancing the signal in order to compensate for time delay generated as a result of the signal leaving the CDMA cellsite, traveling to the remote microcell and returning to the CDMA cellsite.

It is a further object of the present invention to calculate suitable values for padding the sector size to eliminate call setup failures due to the signal delay between the remote and the cellsite.

SUMMARY OF THE INVENTION

The present invention is a method of integrating a microcell system with a CDMA system. The microcell system does not have re-synchronizing capabilities, such as an ADC Kentrox™ system, while the CDMA system has signal advancing capabilities, such as a Lucent™ system.

The present invention provides a method that determines the amount to advance the CDMA signal so that when it reaches the remote microcell, the time delay has been compensated for and the signal is synchronized with the CDMA system. The method also provides for nullifying the round trip time delay allowing call setups to occur normally.

The objects and features will become more apparent to one skilled in the art from the following detailed description taken together with the accompanying drawings and the claims appended hereto.

BRIEF DESCRIPTION OF THE DRAWINGS

FIG. 3 is a sample format for recording data measurements and calculations for a stand alone CDMA;

FIG. 4 is a sample format for recording data measurements and calculations for a simulcast CDMA;

BEST MODE(S) FOR CARRYING OUT THE INVENTION

The present invention will be described in conjunction with an ADC Kentrox™ microcell and a Lucent™ CDMA base station. However, it should be noted that the method's success does not rely on these manufacturers alone, and it is possible to apply the method to other remote microcell systems that do not have re-synchronizing capabilities along with other CDMA base stations that have signal advancing capabilities.

Figure 1:
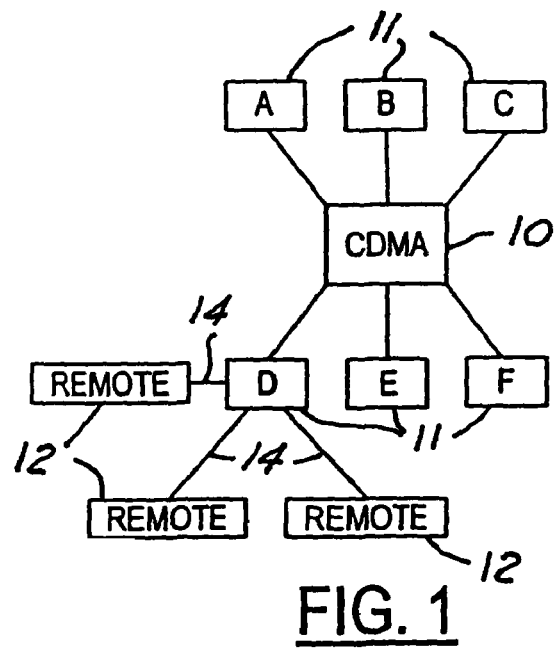
FIG. 1 is a block diagram of a CDMA base station cellsite and its interrelationship with a plurality of remote microcells.

Referring to FIG. 1 there is shown a block diagram of a CDMA base station 10 or cellsite having six faces 11. Three of the faces are physical; namely A, B and C and three faces are virtual, namely D, E, and F. The base station 10 is in communication with a plurality of remote microcells 12 that are linked by optical fibers 14. The length of the fibers 14 varies and can be up to several miles long. So while the remote microcells 12 provide cellular coverage in an area that would not otherwise be accessible, the fiber optic connections induce a time delay in the communication signal which degrades the communication capabilities of the overall system.

The method of the present invention provides enhanced communication between remote microcells and CDMA systems in both simulcast and stand alone configurations. A simulcast CDMA system shares a group of circuits between the base station cellsite 10 and the microcells 12. The simulcast CDMA provides radio coverage to an area that would not otherwise be covered by the existing base station cellsite 10. The addition of the remote microcells 12 does not affect the total number of circuits. Therefore, signal blocking can occur if the demand for circuits exceeds the supply.

In a stand alone configuration, a group of circuits is dedicated to the remote microcell 12, and are not shared with the base station cellsite 10. Therefore, radio coverage is provided to an area that would not otherwise be covered by the existing base station and the total capacity of the cellsite is increased because the number of circuits is increased. It is less likely that blocking will occur because of the increased number of circuits. However, the stand alone system requires more hardware and is therefore more expensive than the simulcast CDMA.

In general the overall method is the same for both the simulcast and stand alone CDMA systems, with only minor differences that will be pointed out during the detailed description as necessary.

For both systems there are several initial conditions that must be satisfied before proceeding with the method of the present invention. The microcell must be physically connected to the base station cellsite. The radio spectrum must be cleared using any known method to ensure the successful transmission of the CDMA signal. For the stand alone configuration, a fully equipped stand alone CDMA shelf must be installed for each remote microcell to be integrated.

The method of integration for both the simulcast and stand alone CDMA configurations can be divided into six sections categorized as follows: Measurements, Installation, Calculations, Translations, Level Setting and Testing. It is possible to integrate more than one remote microcell to each CDMA cellsite, and the sections of the method must be executed separately for each remote being integrated.

The method generally includes taking necessary measurements to perform calculations for setting translation values and power levels in the system so that the signal is advanced to avoid time delay communication problems and the sector size is calculated and adjusted to avoid call setup failures.

Measurements Section

Figure 2:
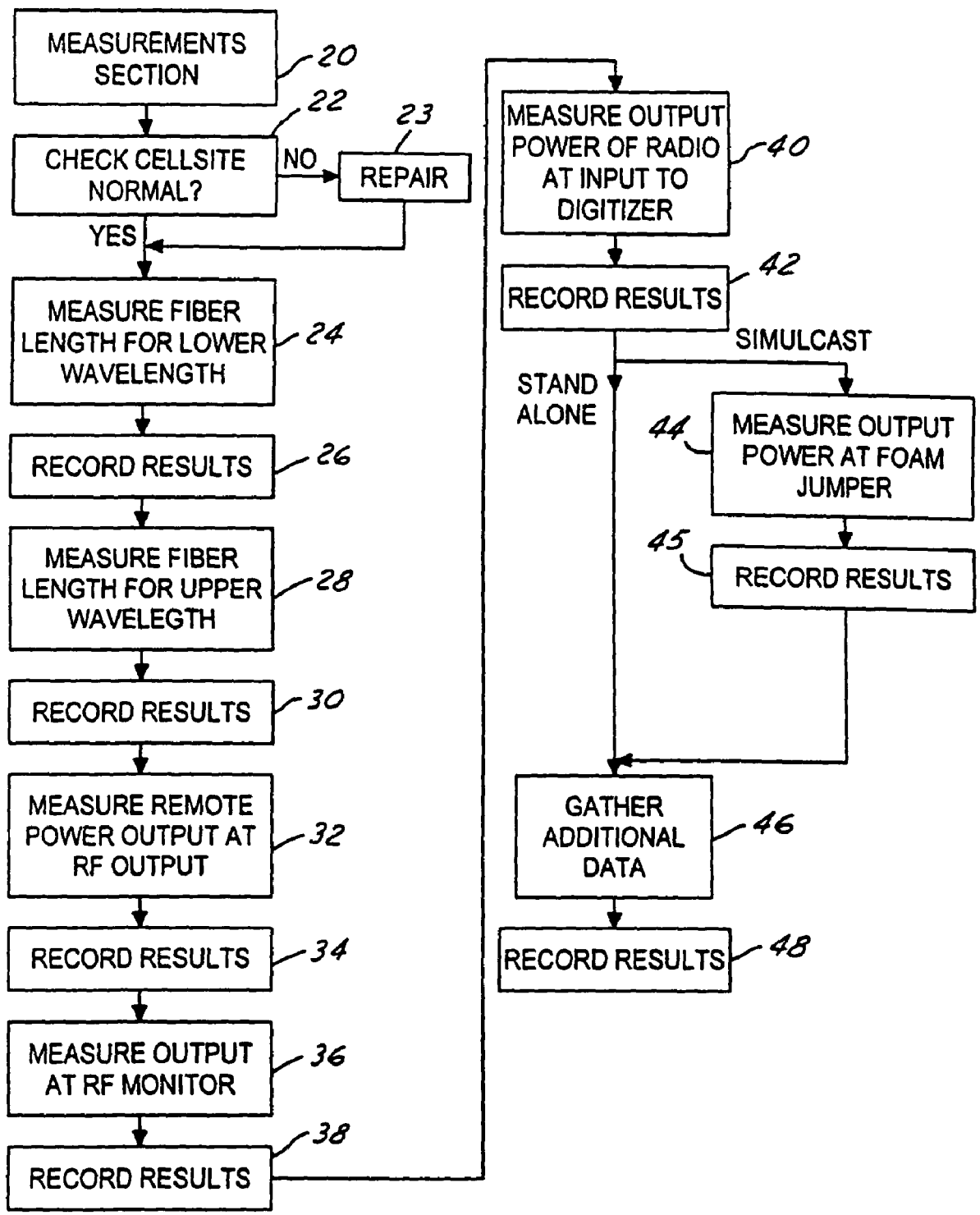
FIG. 2 is a flow chart depicting the measurement section.

The method of the present invention begins by measuring the length of the fiber optic connection between the CDMA base station cellsite 10 and the remote microcells 12, the loss in the fiber optic connections, and the power output at the remote microcells 12. See FIG. 2, which depicts the measurements section 20 of the method in flow chart form. The measurements section 20 obtains the necessary measurement that are required to calculate the proper translation values and power level settings necessary in later sections of the method.

The first step in taking the necessary measurements requires checking 22 the CDMA base station cellsite to ensure it is in normal operating condition. Using interfacing software, one skilled in the art is capable of determining the status of the CDMA cellsite and making the necessary changes should the cellsite be out of its normal condition. Any maintenance deficiencies and repairs 23 should be made before proceeding with the measurements section 20.

The remote microcell, or face, to be integrated should be removed from the cellsite in order to service it under the method of the present invention. None of the measurements should be taken until all active calls have been dropped from the remote microcell.

The fiber length must be measured first for a lower wavelength 24. This can be done by a variety of methods known to one of ordinary skill in the art. The following description is merely an example. The optic fiber 14 should be disconnected at the remote 12 end. The optic fiber 14 is removed at the base station cellsite and connected to an Optical Time Domain Reflector (OTDR).

A lower wavelength is selected. For example, 1310 nm is the lower wavelength specific to the microcell manufacturer for this example. A maximum value is also selected, which value should be in kilofeet (kft) for convenience in the calculations section. The value chosen for the maximum range should be estimated to be equal to or greater than the actual length of the fiber 14 between the cellsite 10 and the remote 12. Typically this range is approximately 13 kft.

Using a 2-Point method, the OTDR will measure the loss and distance in the fiber 14. The distance (in kft) and loss (in dB) are recorded 26 on a data sheet: FIG. 3 depicts a sample data sheet relative to the stand alone CDMA and FIG. 4 depicts a sample data sheet relative to the simulcast CDMA. The distance and loss for the lower wavelength measurement will be displayed between the falling edge of the first signal pulse and the rising edge of the last pulse. If the distance between the two pulses is less than half of the width displayed, then a smaller distance value is chosen for the range and the 2-Point measurement is repeated. If no more than two pulses are displayed, a larger distance value should be chosen for the range and the 2-point measurement should be repeated.

It is also necessary to measure the fiber length for an upper wavelength 28. S sample upper wavelength is selected, for example 1550 nm due to the manufacturer of the microcell in the present example, and the 2-Point measurement steps are repeated. The results are also recorded 30 on a data sheet. After the fiber length in the upper wavelength is measured, the fiber is reconnected at the remote location. If more than one remote 12 is being integrated, the above steps should be repeated for each remote. Once all remote measurements have been taken, the fibers can be reconnected at the base station cellsite.

The next step is to measure the power output at the remote microcell 32. A power meter and sensor should be zeroed and calibrated to ensure accurate measurements the antenna feedline from the remote microcell's RF output connector is disconnected, and the power sensor to the RF output is connected. A single Voice-Radio Channel Unit (V-RCU) is then identified as the "master" radio for the remote to be integrated. The radio number and channel should be noted for future reference. Once the radio is configured as the "master", the radio transmitter is turned on. The radio is set to the same Voice Radio Attenuation Level (VRAL) setting as the remote 12 uses in normal operation. The output power is measured in dBm and the values are recorded 34 on the data sheet.

Subsequently, the radio is deconfigured and the antenna feedline is reconnected to the remote's RF output power connector. The power measurements are repeated with the power sensor connected to the remote's RF monitor port 36 and the results are recorded 38. The power measurements are repeated and determined for all of the remotes being integrated.

The power meter is then applied to the base station cellsite to measure the output power of one radio at the input of one cellsite digitizer 40. The cable between the output of the Radio Interface Module (RIM) card 39, (see FIG. 6), and the input of the first digitizer is disconnected. The power output of the digitizer is measured by following the same steps outlined above for measuring the power output at the RF output connector. This is accomplished for each digitizer of the CDMA cellsite and the results are recorded 42.

For a simulcast CDMA only, the power output for the CDMA should be measured at the output port of the transmitter base station 44, also known as the foam jumper, for each remote being integrated. It is important to make sure that all of the digitizers that were removed for output power measurements in the previous step are reconnected before measuring the output power at the foam jumper 44. The results are again recorded 45.

For both the simulcast and stand alone CDMA's, the following additional data should be collected 46:
  (a) the total number of radios assigned to the remote being integrated with the CDMA;
  (b) the number of radios assigned to the remote which are in the CDMA bandwidth that have been removed from service when spectrum clearing is initiated;
  (c) the RIM card transmit and receive antenna attenuation setting for each remote being integrated;
  (d) the version of the digitizer used for each remote;
  (e) the remote attenuation level;
  (f) the Baseband Combiner and Radio (BCR) attenuation of the remote being integrated; and
  (g) the pn-offset of the remote being integrated.
These values should be recorded 48 on the respective data sheet for future reference in the calculations and translations sections for the method of the present invention.

Installation Section

The purpose of the installation section is to accomplish the physical interconnection of the microcell hardware to the CMDA base station cellsite. Additional measurements are taken as necessary. The installation is different for the stand alone and simulcast CDMA systems.

Stand Alone CDMA Installation

Figure 5:
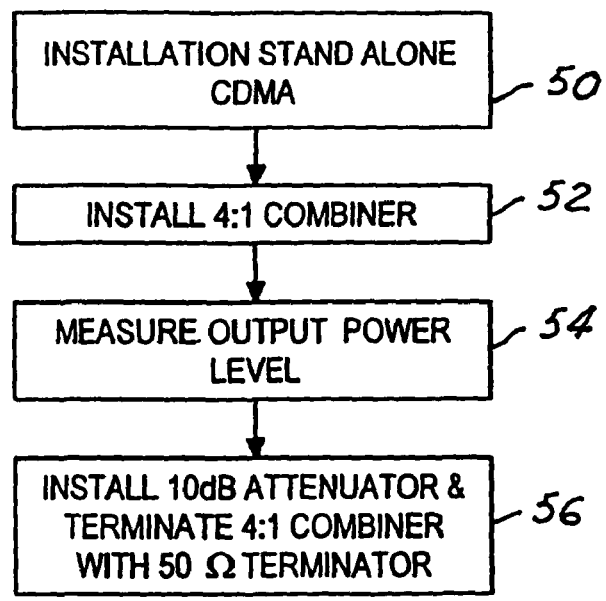
FIG. 5 is a flow chart depicting the installation section for the stand alone CDMA.
Figure 6:
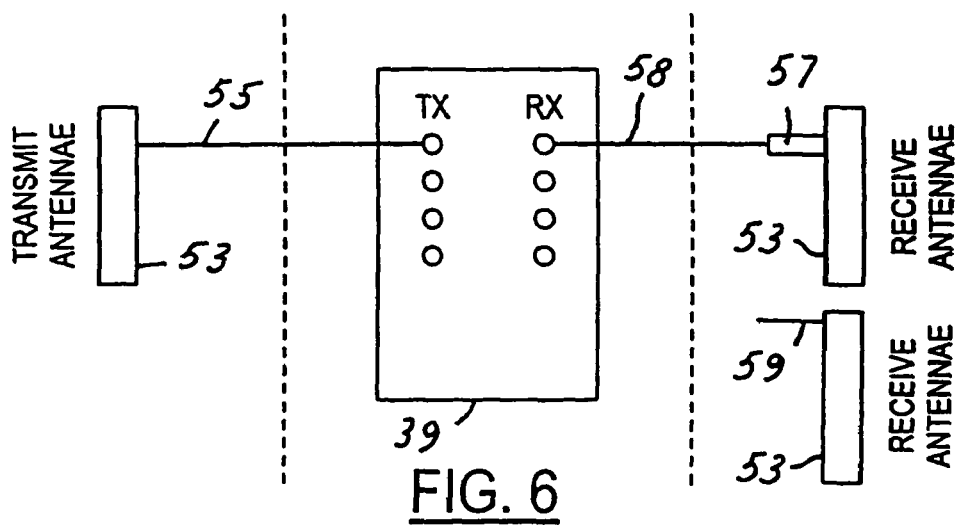
FIG. 6 is an interconnection diagram for the stand alone CDMA.

Referring to the flow chart of FIG. 5, the method of installation 50 for a stand alone CDMA is shown. For the stand alone CDMA system, a 4:1 combiner is installed 52 for each face, and the input cable from the associated Base Band Assembly (BBA) is connected to the proper input of the 4:1 combiner (see FIG. 6 for the hardware interconnection diagram for the 4:1 combiner 53). The output power level reading is measured 54 at the 4:1 combiner. The BBA is restored to service and the output gain potentiometer of the BCR is adjusted to an output level of −23 dBm. The BBA is then removed from service to avoid transmitting from the BBA with no load. As shown in FIG. 6, one end of the transmit cable 55 is connected to the 4:1 combiner 53 for the remote being integrated, and the other end of the transmit cable 55 is connected to the next available input on the RIM card 39.

A 10 dB attenuator 57 is connected 56 to the top of the 4:1 combiner 53 in the CDMA for the remote being integrated. One end of the receive cable 58 is connected to the attenuator 57 and the other end of the receive cable 58 is connected to the next available input on the RIM card 39. Finally, the 4:1 combiner 53 is terminated with a 50Ω terminator 59. The next step is to proceed to the calculations section.

Simulcast CDMA Installation

Figure 7:
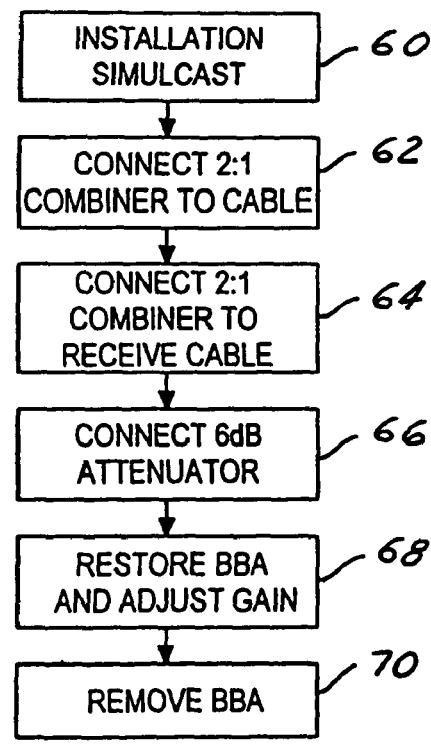
FIG. 7 is a flow chart depicting the installation section for the simulcast CDMA.
Figure 8:
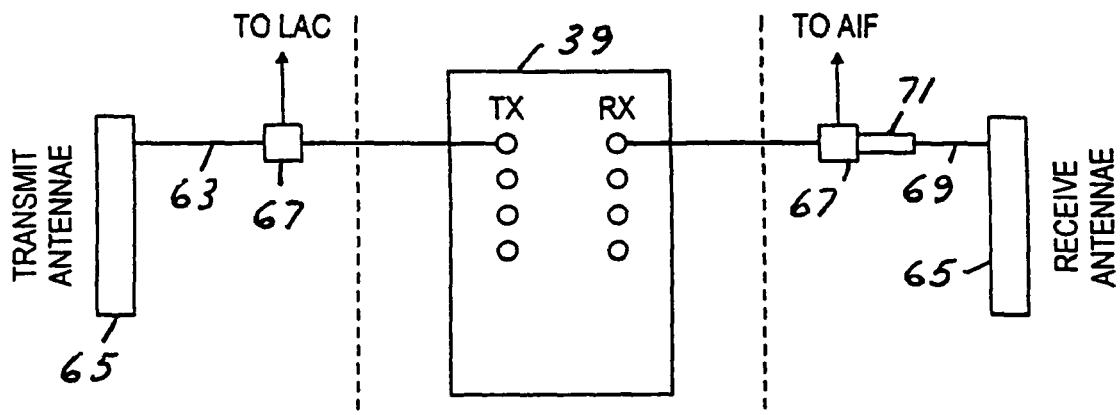
FIG. 8 is an interconnection diagram for a simulcast CDMA.

For the simulcast CDMA, the installation section 60 is depicted as a flow chart in FIG. 7. The hardware interconnection diagram is depicted in FIG. 8. The first step is to insert 62 a 2:1 combiner 67 on the transmit cable 63. The transmit cable 63 that runs to the Linear Amplifier Circuit (LAC) of the CDMA from the 4:1 combiner 65 is removed and connected to a 2:1 combiner 67. The transmit cable for the microcell is then connected to the 2:1 combiner 67, and the transmit cable is connected to the next available input on the RIM card 39.

The next step is to insert 64 a 2:1 combiner 67 on the receive cable 69. The existing receive cable is removed from the top of the 4:1 combiner 65, and connected to the 2:1 combiner 67. A 6 dB attenuator 71 is connected 66 to another port of the 2:1 combiner 67 and the receive cable 69 is then connected to the 6 dB attenuator 71. The Receive cable 69 is connected to the next available input on the RIM card 39. A connection should also be made between the center of the 2:1 combiner 67 and the antenna interface frame (not shown). The receive cable 69 is also re-connected to the top of the 4:1 combiner 65.

The BBA is restored to service 68, and the output gain potentiometer is adjusted on the BCR until the output level 44 previously recorded in the measurements section 40 is displayed. Finally, the BBA is removed from service unconditionally 70. The next step is to proceed to the calculations section.

Calculations Section

Figure 9:
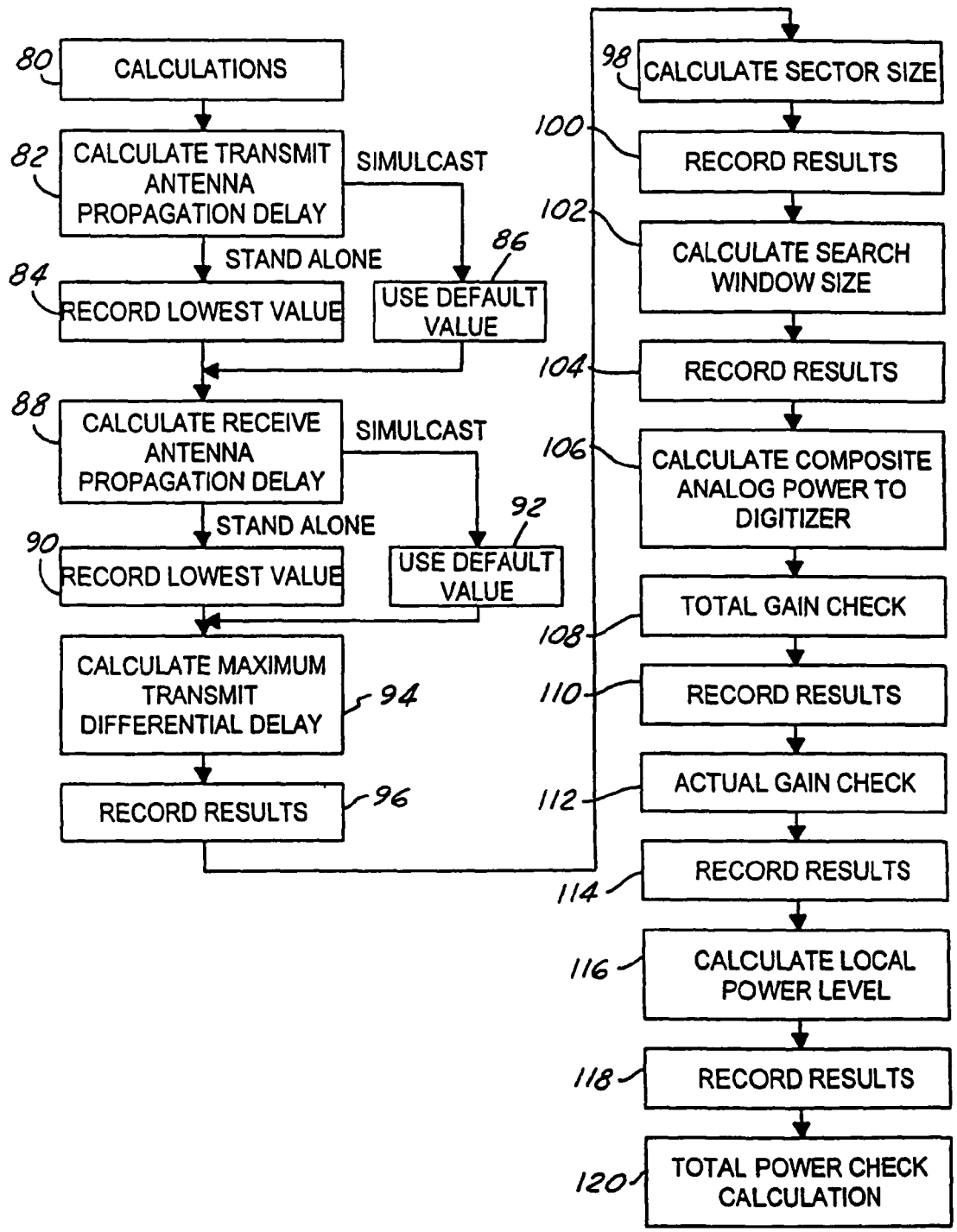
FIG. 9 is a flow chart depicting the calculations section.

A flow chart for the calculations section 80 is shown in FIG. 9. The calculations section 80 uses the data obtained in the measurements section 20 to define values that will be used in the translations 100 and level setting sections 200 of the method that will allow the signal to be sufficiently advanced to as to compensate for the time delay. The calculations are very similar for both the stand alone CDMA and the simulcast CDMA and the differences will be pointed out accordingly.

The first calculation is the transmit antenna propagation delay calculation 82. The maximum forward path propagation delay is determined and this value is recorded in the data sheets for each remote on the face being integrated. For this purpose, the following calculation table can be used:

| Fiber distance measurement in kft for remote: | | |
|---|---|---|
| Conversion factor for kft to miles: | ÷ | 5.280 |
| Conversion factor for fiber distance to delay: | × | 7.878 |
| Add propagation delay induced by cellsite: | + | 22.80 |
| Add propagation delay induced by digitizer: | + | 1 or 8 |
| Total transmit propagation delay for this remote: | = | |

This calculation is repeated for each remote on the face being integrated and the results are recorded on the respective data sheet.

After the forward path propagation delays have been calculated for all the remotes on the stand alone CDMA face, the lowest value 84 on the data sheet is selected. This value is used in the translations section 100.

Unlike a stand alone CDMA, the changes made to the operating system for a simulcast microcell also affect the base station cellsite. To avoid altering the operation of the base station, a default value of 22.8 microseconds 86 is used in the translations section 100 for the simulcast CDMA method. This value is recorded in the simulcast data sheet (FIG. 4). While this value is 22.8 microseconds for the present example, it will vary depending on the manufacturer and may vary with different equipment.

Next, for both stand alone and simulcast CDMA, the maximum receive path propagation delay 88 is determined for each remote on the face being integrated and these values are recorded 90 on the respective data sheet. The following calculation table may be used:

| Fiber length from measurements section: | | |
|---|---|---|
| Conversion factor for kft to miles: | ÷ | 5.280 |
| Conversion factor for fiber distance to delay: | × | 7.878 |
| Add propagation delay induced by cellsite: | + | 14.00 |
| Add propagation delay induced by digitizer: | + | 3 or 17 |
| Total receive path propagation delay for this remote: | = | |

After the receive path propagation delays have been calculated for all remotes on the stand alone face, the lowest value in the stand alone data sheet is selected and recorded 90. This value is used in the translations section 100.

Since changes made for a simulcast microcell also affect the base station cellsite, a default value 92 of 14.0 microseconds is used in the translations section. This value is recorded in the simulcast data sheet. Again, this value is dependent upon the specific equipment used and may vary with a different manufacturer.

The next step is to determine the maximum transmit differential delay 94 of all remotes on the face being integrated by calculating the differential delay for each remote. The results should be recorded in the data sheet. There are different procedures for the stand alone and simulcast CDMA systems. The following calculations table highlight the differences.

For the stand alone CDMA, the calculation table is as follows:

| Transmit antenna propagation delay: | | |
|---|---|---|
| Receive antenna propagation delay: | + | |
| Enter subtotal from above: | = | |
| Average subtotal: | ÷ | 2 |
| Total transmit differential delay for this remote: | | |

This calculation is repeated for each remote on the face being integrated, and recorded 96 on the stand alone data sheet.

For the simulcast CDMA, the calculation table is slightly different:

| Transmit antenna propagation delay: | | |
|---|---|---|
| Receive antenna propagation delay: | + | |
| Base station induced transmit propagation delay: | − | 22.8 |
| Base station induced receive propagation delay: | − | 14.0 |
| Enter subtotal: | = | |
| Average subtotal: | ÷ | 2 |
| Total transmit differential delay for this remote: | = | |

The difference for the simulcast CDMA is that the default values of the actual delay of the base station transmitter and the base station receiver are included to ensure the base station remains unaffected. For the present example, the base station transmitter delay is 22.8 microseconds and the base station receiver delay is 14.0 microcseconds. These values are specific to the equipment manufacturer and may vary with other manufacturer's equipment.

This calculation is repeated for each remote on the face being integrated and the results are recorded 96 in the simulcast data sheet. If this value exceeds a predetermined time limit, 90 microseconds in the present example, the face cannot be successfully integrated. The hardware has sepcific limits built into it that cannot be overridden. Therefore, if the time delay is more than the built-in limits of the hardware, it will not be possible to advance the signal.

Selecting the maximum value to be used in the translation section is the same for both the stand alone CDMA and the simulcast CDMA. Each remote's data sheet should be examined to find the largest and smallest values of the transmit differential delay calculated in the previous step. The maximum differential delay 95 is calculated using the following data table and the value is recorded 96 on the data sheet:

| Largest transmit differential delay of all remotes: | |
|---|---|
| Smallest transmit differential delay of all remotes: | − |
| Maximum transmit differential delay: | = |

The next step is to calculate the sector size 98 for the face being integrated. The method of the present invention pads the sector size value so that suitable values for the sector size allow call setups without failure.

The following calculation table can be used to determine the sector size translation value:

| Maximum transmit differential delay: | | |
|---|---|---|
| Add free-space propagation delay for 3 miles: | + | 16.08 |
| Enter subtotal: | = | |
| Convert microseconds to miles: | ÷ | 5.36 |
| Sector size: | | |

This value should be recorded on the respective data sheet 100. The free-space propagation delay for 3 miles is factored into the calculation to ensure sufficient overlap of the sector size. This value will be manufacturer dependent and could vary depending on the equipment design.

The next calculation is the search window size 102 for the face being integrated. This varies slightly between the stand alone CDMA configuration and the simulcast CDMA configuration. This value should be recorded 104 on the data sheet. The following calculation table is for a stand alone CDMA:

| Maximum transmit differential delay: | | |
|---|---|---|
| Additional delay based on assumption remote is within 3 miles of nearest neighbor: | + | 16.28 |
| Subtotal: | | |
| Double for + and − center of window: | × | 2 |
| Cell search window size: | | |

The following calculation table is used for a simulcast CDMA:

| | | |
|---|---|---|
| Maximum transmit differential delay: | | |
| Base station induced propagation delay: | − | 14.0 |
| Additional delay based on assumption remote is within 3 miles of nearest neighbor: | + | 16.28 |
| Subtotal: | | |
| Double for + and − center of window: | × | 2 |
| Cell search window size: | | |

The simulcast CDMA must include the manufacturer's default value for the delay induced by the base station transmitter. This is the actual delay induced by the base station transmitter.

The next steps involve power calculations that are the same for both the stand alone CDMA and the simulcast CDMA. The actual input analog power to the digitizer is determined when all radios on the face to be integrated are active 106. The following calculation table may be used:

| | | |
|---|---|---|
| Total number of radios on face: | | |
| Number of radios removed from face: | − | |
| Subtotal: | = | |
| Logarithm (base 10) of subtotal: | log | |
| Multiply by a factor of 10: | × | |
| Power measured for 1 radio at input to digitizer: | | |
| Composite analog power to input of digitizer: | | |

The sign of the analog radio input power may be a negative value and should be scrutinized.

The total gain and the actual gain of the system for each remote on the face being integrated is calculated next by using the following calculation table. The calculations are the same for both the stand alone CDMA and the simulcast CDMA. For the total gain calculation 108, the following data table is used:

Output power measured in measurements section:

Input power for one radio measured at input to digitizer:

LPA attenuation of remote:

Total gain of system for this remote:

This calculation is performed for each remote on the face being integrated, and the results are recorded on the data sheet 110.

The actual gain of the system 112 is calculated for each remote on the face being integrated using the following calculation table:

| | | |
|---|---|---|
| Output power measured at remote: | | |
| Input power for 1 analog radio measured at digitizer input: | − | |
| LPA attenuation of this remote: | + | |
| Actual system gain for this remote: | = | |

This calculation should be made for each remote on the face being integrated and recorded on the data sheet 114.

Next, it will be necessary to calculate the CDMA input power level to the digitizer 116 to determine the adjustment that needs to be made to the Baseband Combiner and Radio. The following calculations table may be used for both a stand alone and a simulcast CDMA:

| | | |
|---|---|---|
| +26 dBm for CDMA: | | 26 |
| Expected System gain (given by Microcell Mfr.): | − | 61 |
| LPA Attenuation previously calculated: | + | |
| Adjust CDMA input level at digitizer to this amount: | = | |

This calculation is repeated for each remote on the face being integrated, and recorded 118 in the data sheet.

The total CDMA and analog composite power 120 is determined when all radios on the face to be integrated are active and all CDMA channels on the face are active. The sign of the analog or CDMA input power should be noted, as the value may be negative.

| | | |
|---|---|---|
| Analog composite power to digitizer: | | |
| Divide by 10: | ÷ | 10 |
| Raise analog composite power to the power of base 10: | | $10^x$ |
| CDMA ideal composite power level to digitizer: | | |
| Add 7 dB to allow for a fully loaded CDMA: | + | 7 |
| Divide by 10: | ÷ | 10 |
| Raise result to the power of base 10: | | $10^x$ |
| Add Analog composite power total: | + | |
| Subtotal: | = | |
| Logarithm (base 10): | | log |
| Multiply by 10: | × | 10 |
| Analog and digital composite power to input of digitizer: | = | |

Translations Section

Figure 10:
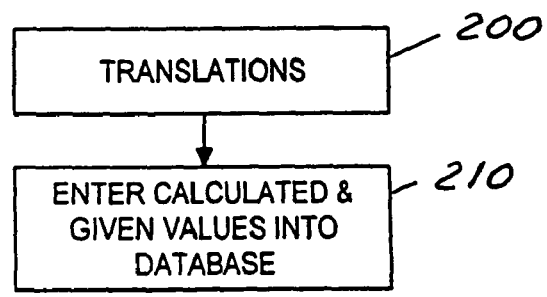
FIG. 10 is a flow chart depicting the translation section.

In the translations section 200 of the method of the present invention, the appropriate values are entered into the system database 210 to allow the microcell to function in the CDMA system (see FIG. 10). Some values are assumptions based on the manufacturer's specifications that can be substituted for manufacturer's other than those discussed herein. Other values are taken from the calculations section.

For a stand alone CDMA, the following translations are made:

| | |
|---|---|
| Transmit Antenna Propagation Delay from Calculations Section: | |
| Receive Antenna Propagation Delay from Calculations Section: | |
| Search Window Size from Calculations Section: | |
| Sector Size from Calculations Section: | |
| Maximum Differential Transmit Delay from Calculations Section: | |
| Initial Power Offset for Access (Mfr. Spec.): | −5 |
| Access Probe Power Increment (Mfr. Spec.): | 4 |
| BCR Attenuation Factor (Mfr. Spec.): | 6 |
| Access Channel Preamble Length (Mfr. Spec.): | 2 |
| Time Randomization for Access Channel Probes (Mfr. Spec.): | 6 |
| Eb/No Setpoint - Minimum (Mfr. Spec.): | 5 |
| Eb/No Setpoint - Maximum (Mfr. Spec.): | 9.8 |

For a simulcast CDMA, the following translations are made:

| | |
|---|---|
| Transmit Antenna Propagation Delay from Calculations Section: | 22.8 |
| Receive Antenna Propagation Delay from Calculations Section: | 14 |
| Search Window Size from Calculations Section: | |
| Sector Size from Calculations Section: | |
| Maximum Differential Transmit Delay from Calculations Section: | |
| Initial Power Offset for Access (Mfr. Spec.): | −5 |
| Access Probe Power Increment (Mfr. Spec.): | 4 |
| Access Channel Preamble Length (Mfr. Spec.): | 2 |
| Time Randomization for Access Channel Probes (Mfr. Spec.): | 6 |
| Eb/No Setpoint - Minimum (Mfr. Spec.): | 5 |
| Eb/No Setpoint - Maximum (Mfr. Spec.): | 9.8 |

The database should be updated so that the operating system uses the above entered values ensuring the signal is sufficiently advanced to compensate for the time delay generated during the signal's travel over the fiber optic connection. The translation values also ensure that the sector size is sufficiently padded to avoid call setup failures.

Level Setting Section

Figure 11:
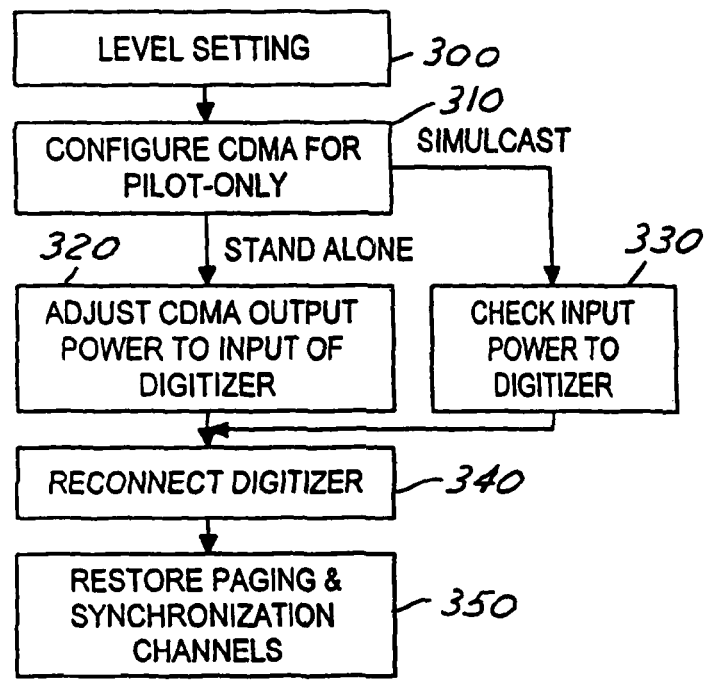
FIG. 11 is a flow chart depicting the level setting section.

The level setting section 300 uses previous measurements and calculations to ensure the analog and CDMA output levels are properly set. A flow chart is shown in FIG. 11.

The first step is to configure the CDMA for pilot-only 310 by updating the database. The pilot acts as a beacon for a mobile device to locate the base station. Pilot-only ensures the CDMA channels are sufficiently referenced to a known and repeatable state. The existing values for the paging channel gain and synchronization channel gain are recorded, then the values are updated to zero. These changes to the database will take effect by logically removing and then restoring the CDMA cluster controller (CCC) for the face being integrated.

For the stand alone CDMA, the power sensor is reconnected to the digitizer input cable previously used for the analog radio power measurement, and the BBA is logically restored to service unconditionally. The CDMA output power to the input of the digitizer 320 is adjusted by observing the display of the power meter and adjusting the output power potentiometer on the front panel of the BCR until the meter reads the value calculated 106 in the calculations section 80.

For the simulcast CDMA, the power sensor head is removed from the foam jumper and the foam jumper is reconnected to the waveguide from which it was removed. The first remote for the face being integrated is selected, and the power sensor head is connected to the input cable of this remote's digitizer. The BBA is logically restored to service unconditionally, and the power meter display is observed 330. It should be within ±3 dBm with the ideal input level calculated in the calculations section. If the display exceeds the value by more than 3 dBm, the appropriate in-line attenuator should be used on the transmit cable to reduce the signal to within 3 dBm of the ideal level. If the value is less than the ideal level by more than 3 dBm, it is possible that there may be insufficient signal strength to make CDMA calls from the microcell. This can be determined in the testing section.

For both the stand alone and simulcast CDMA, the BBA is logically removed from service unconditionally and the digitizer is reconnected 340.

For a simulcast CDMA, the power display comparison is repeated for each remaining digitizer on the face being integrated.

For both the stand alone and simulcast CDMA's, the paging channel gain and synchronization channel gain are restored 350 to the values recorded above, before these values were set to zero.

Testing Section

Figure 12:
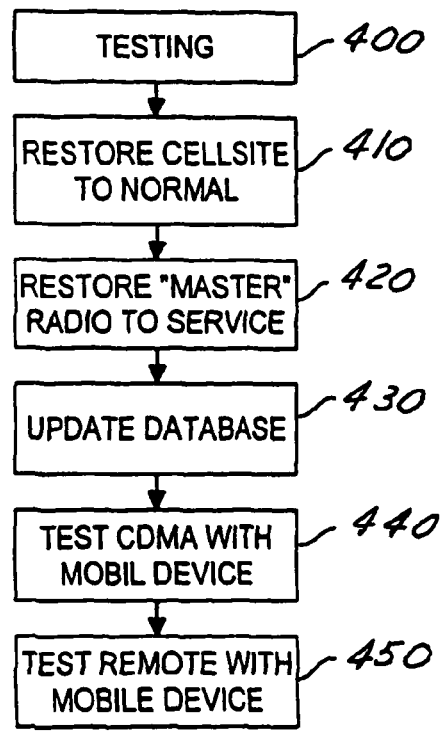
FIG. 12 is a flow chart depicting the testing section.

A flow diagram for the testing section 400 is shown in FIG. 12. After restoring the cellsite to normal service 410, the testing procedures ensure the newly integrated face is operating normally. The testing procedure checks for RF leakage in the cellsite and for normal propagation at each remote.

The previously configured "master" radio is restored to service 420. The BBA for the newly integrated face is logically restored to service unconditionally. The database is updated 430 by logically removing and restoring the CCC for the newly integrated face. The CDMA is powered up and tested with a mobile device 440. The mobile device is moved about the cellsite until the newly integrated face is shown on the phone's display. The system is then accessed by dialing a working number. After the call has been established, it should be verified that it is digital service. If the call is consistently forced to analog, ensure the paging channel and synchronization channel have been reset, and the CCC removed and restored. If access is still not possible, the cellsite should be cleared and the test repeated.

The service in an area close to the remote should be tested to obtain service from the remote 450. The remote should be fully functional on a CDMA call. This step should be repeated for each remote on the newly integrated face.

The above described method of six sections interconnects a CDMA cellsite, in either a stand alone or simulcast configuration, with a microcellular infrastructure which allows CDMA calls to be processed through the microcell without undue signal delay, without an oversized search window, and with a padded sector size. The signal is advanced so that the delay is unnoticed by the CDMA system and all communications remain in synchronization, enabling reliable call handling between a cellsite and a remote microcell.

Various modifications of the invention, in addition to those shown and described herein, will be apparent to those skilled in the art from the foregoing description and accompanying drawings. Such modifications are intended to fall within the scope of the appended claims.

What is claimed is:

1. A method of integrating a remote microcell with at least one face of a code division multiple access (CDMA) communication system capable of signal advancing, the method comprising:
   dropping all active calls from the remote microcell;
   measuring, at an optical time domain reflectometer, a length of a fiber optic connection between a CDMA base station of the CDMA communication system and the remote microcell;
   measuring loss in the fiber optic connection;
   measuring a power output at the remote microcell;
   measuring a power output at the CDMA base station;
   collecting data relating to a total number of radios assigned to the remote microcell being integrated with the CDMA communication system, a number of radios assigned to the remote microcell that are in a CDMA bandwidth that have been removed from service, a transmit and receive antenna attenuation setting for the remote microcell, a remote attenuation level, a baseband combiner and radio attenuation of the remote microcell, and a pn-offset of the remote microcell;
   installing remote microcell hardware at the CDMA base station;
   calculating values using measurement data, the calculated values being a transmit antenna propagation delay, a maximum receive path propagation delay, a maximum transmit differential delay, a sector size, a search window size, power calculation, a total gain, an actual gain, and a CDMA power input level;
   translating the calculated values to allow the remote microcell to function in the CDMA communication system and to provide a sufficient sector size;
   level setting an output power level of the CDMA base station based on the calculated values to adapt the CDMA base station to communicate with the remote microcell; and
   testing the CDMA communication system after restoring the CDMA communication system to normal service.

2. The method of claim 1, further comprising:
   checking the CDMA base station; and
   determining whether the CDMA base station is in normal operating condition.

3. The method of claim 2 further comprising making necessary changes to bring the CDMA base station into its normal operating condition.

4. The method of claim 1 wherein measuring the length of the fiber optic connection and measuring loss in the fiber optic connection comprises:
    disconnecting the fiber optic connection at the remote microcell;
    removing the fiber optic connection at the CDMA base station;
    connecting the fiber optic connection at the CDMA base station to an optical time domain reflector;
    selecting a lower wave-length;
    selecting a maximum length dimension;
    measuring loss and distance in the fiber optic connection at the lower wave-length using the optical time domain reflector;
    selecting an upper wave-length;
    measuring loss and distance in the fiber optic connection at the upper wave-length using the optical time domain reflector; and
    reconnecting the fiber optic connection at the CDMA base station.

5. The method of claim 1 wherein measuring a power output at the remote microcell further comprises:
    calibrating a power meter and a power sensor;
    disconnecting an antenna feedline from a radio frequency (RF) output connector of the remote microcell;
    connecting the power sensor to the RF output connector of the remote microcell;
    identifying a single voice-radio channel unit as a master radio for the remote microcell;
    turning on the single voice-radio channel unit;
    setting the single voice-radio channel unit to a voice radio attenuation level that is the same as a voice radio attenuation level used by the remote microcell in normal operation;
    measuring output power from the power sensor;
    reconnecting the antenna feedline to the RF output connector of the remote microcell;
    disconnecting the antenna feedline from an RF monitor port of the remote microcell;
    connecting the power sensor to the RF monitor port of the remote microcell;
    identifying a single voice-radio channel unit as a master radio for the remote microcell;
    turning on the single voice-radio channel unit;
    setting the single voice-radio channel unit to the voice radio attenuation level that is the same as the voice radio attenuation level used by the remote microcell in normal operation;
    measuring the output power from the power sensor; and
    reconnecting the antenna feedline to the RF monitor port of the remote microcell.

6. The method of claim 1 wherein measuring the power output at the CDMA base station further comprises, for each digitizer of the CDMA base station:
    disconnecting a cable between an output of a radio interference module in the CDMA base station and an input of a first digitizer at the CDMA base station;
    connecting a power sensor to the input of the first digitizer;
    identifying a single voice-radio channel unit as a master radio;
    turning on the single voice-radio channel unit;
    setting the voice-radio channel unit to a voice radio attenuation level that is the same as a voice radio attenuation level used by the input of the first digitizer for normal operation;
    measuring output power from the power sensor; and
    reconnecting the cable.

7. The method of claim 6 wherein the CDMA communication system further comprises simulcast CDMA and further comprising:
    ensuring all digitizers have been reconnected; and
    measuring a power output at an output port of a CDMA base station transmitter for the remote microcell.

8. The method of claim 1 wherein the CDMA communication system further comprises a stand-alone CDMA base station and installing the remote microcell hardware at the CDMA base station further comprises:
    installing a combiner for each face of the stand-alone CDMA base station;
    connecting an input cable from a base band assembly to a respective input of the combiner;
    measuring an output power level at the combiner;
    restoring the base band assembly to service;
    adjusting an ouptut gain potentiometer to a predetermined output level;
    removing the base band assembly from service;
    connecting one end of a transmit cable to the combiner and another end of the transmit cable to an available input on a radio interface module card;
    connecting a 10 decibel (dB) attenuator to the combiner;
    connecting one end of a receive cable to the 10 dB attenuator and another end of the receive cable to a next available input of the radio interface module card; and
    terminating the combiner.

9. The method of claim 1 wherein the CDMA communication system further comprises a simulcast CDMA base station and installing the remote microcell hardware at the CDMA base station further comprises:
    removing a first combiner from a transmit cable;
    inserting a second combiner on one end of the transmit cable;
    connecting another end of the transmit cable to an available input on a radio interface module card;
    removing the first combiner from a receive cable;
    inserting a second combiner on one end of the receive cable;
    attenuating the second combiner on one end of the receive cable;
    connecting another end of the receive cable to a next available input on the radio interface module card;
    connecting the second combiner with an antenna interface;
    re-connecting the first combiner to the receive cable;
    restoring a base band assembly to service;
    adjusting an output gain potentiometer to a predetermined output level; and
    removing the base band assembly from service.

10. The method of claim 1 wherein calculating values further comprises:
    calculating the transmit antenna propagation delay for all remote microcells in a stand-alone CDMA base station by multiplying the length of the fiber optic connection by a conversion factor for fiber distance to delay, adding propagation delay induced by the CDMA base station and adding propagation delay induced by a digitizer; and
    selecting a lowest value to be used in translating the calculated values.

11. The method of claim 1 wherein the CDMA base station is a simulcast CDMA base station and calculating values further comprises setting the transmit antenna propagation delay to a predefined fixed value.

12. The method of claim 1 wherein calculating values further comprises:
    calculating the maximum receive path propagation delay for each remote microcell being integrated with a stand alone CDMA base station by multiplying the length of the fiber optic connection by a conversion factor for fiber length to delay, adding a propagation delay induced by the CDMA base station and a propagation delay induced by a digitizer; and selecting a lowest value of the maximum receive path propagation delay to be used in translating the calculated values.

13. The method of claim 1 wherein the CDMA base station is a simulcast CDMA base station and calculating values further comprises setting the maximum receive path propagation delay to a predefined fixed value.

14. The method of claim 1 wherein calculating values further comprises:
    calculating the maximum transmit differential delay for each remote microcell at a stand alone CDMA base station by averaging the transmit antenna propagation delay with the maximum receive path propagation delay for each remote microcell to result in a total transmit differential delay for each remote microcell; and
    selecting a maximum value to be used in translating the calculated values.

15. The method of claim 1 wherein the CDMA base station is a simulcast CDMA base station and calculating values further comprises:
    for each remote microcell for the simulcast CDMA base station:
        adding the transmit antenna propagation delay and the maximum receive path propagation delay to obtain a sum;
        subtracting a base station induced transmit propagation delay and a base station induced receive propagation delay to obtain a difference; and
        dividing the difference by two for a total transmit differential delay; and
    selecting a maximum value to be used in translating the calculated values.

16. The method of claim 1 wherein calculating values further comprises:
    calculating a transmit differential delay for each remote microcell;
    selecting the largest transmit differential delay;
    selecting the smallest transmit differential delay; and
    subtracting the smallest transmit differential delay from the largest transmit differential delay to calculate the maximum transmit differential delay.

17. The method of claim 16 wherein calculating values further comprises adding a predetermined freespace propagation delay to the maximum transmit differential delay to determine a sector size translation value.

18. The method of claim 16 wherein the CDMA base station is a stand-alone CDMA base station and further comprising:
    adding to the maximum transmit differential delay a predetermined additional delay based on a distance assumption to the maximum transmit differential delay to obtain a sum; and
    multiplying the sum by two to determine a cell search window size.

19. The method of claim 16 wherein the CDMA base station is a simulcast CDMA base station and further comprising:
    subtracting a predetermined base station induced delay from the maximum transmit differential delay to obtain a difference;
    adding to the difference a predetermined additional delay based on a distance assumption to obtain a sum; and
    multiplying the sum by two to determine a cell search window size.

20. The method of claim 1 wherein level setting further comprises:
    configuring the CDMA base station for a pilot acting as a beacon for a mobile device to locate a base station;
    recording existing values for a paging channel gain and a synchronization channel gain;
    updating the values for the paging channel gain and the synchronization channel gain to zero;
    adjusting the power output of the CDMA base station to a calculated value; and
    restoring the values for the paging channel gain and the synchronization channel gain to the values prior to updating the values to zero.

21. The method of claim 1 wherein testing the CDMA communication system further comprises:
    checking for RF leakage in the CDMA base station; and
    checking for normal propagation at the remote microcell.

22. A method of adapting CDMA base station to communicate with a remote microcell, the method comprising:
    measuring a length of a fiber optic connection between the CDMA base station and the remote microcell using an optical time domain reflector;
    determining a transmit differential delay based on the measured length;
    measuring a loss in the fiber optic connection using the optical time domain reflector;
    measuring power output at the remote microcell using a power sensor to determine a first output power associated with the remote microcell;
    measuring a power output at the CDMA base station to determine a second output power associated with the CDMA base station;
    calculating a total gain based on the first and second output powers and the loss; and
    adjusting power at the CDMA base station based on the first and second output powers to adapt the CDMA base station to communicate with the remote microcell.

23. The method of claim 22, further comprising calculating a sector size associated with the remote microcell based on the transmit differential delay.

24. The method of claim 22, further comprising calculating a cell search window size based on the transmit differential delay.

25. The method of claim 22, further comprising identifying a single voice radio channel of the remote microcell as a master radio of the remote microcell before measuring the power output at the remote microcell.

26. The method of claim 25, wherein the master radio is set to a voice radio attenuation level that the remote microcell uses in normal operation before measuring the power output at the remote microcell.

27. The method of claim 22, wherein the fiber optic connection is disconnected prior to measuring the length.

28. The method of claim 22, wherein the length and the loss are measured at a first wavelength and at a second wavelength, the first wavelength being lower than the second wavelength.

29. The method of claim 22, wherein determining the transmit differential delay comprises:
    calculating a transmit propagation delay for each remote microcell connected to the CDMA base station;

selecting a largest calculated transmit propagation delay;
calculating a receive propagation delay for each remote microcell connected to the CDMA base station;
selecting a largest calculated receive propagation delay; and calculating the transmit differential delay based on the largest calculated transmit propagation delay and the largest receive propagation delay.

\* \* \* \* \*